US009763103B2

(12) United States Patent
Claussen et al.

(10) Patent No.: US 9,763,103 B2
(45) Date of Patent: Sep. 12, 2017

(54) FREQUENCY BAND SELECTION (71) Applicant: Alcatel Lucent, Boulogne Billancourt (FR)

(72) Inventors: Holger Claussen, Blanchardstown (IE); Lester Ho, Blanchardstown (IE)

(73) Assignee: Alcatel Lucent, Boulogne-Billancourt (FR)

( * ) Notice: Subject to any disclaimer, the term of this patent is extended or adjusted under 35 U.S.C. 154(b) by 166 days.

(21) Appl. No.: 14/428,113

(22) PCT Filed: Sep. 6, 2013

(86) PCT No.: PCT/EP2013/002683
§ 371 (c)(1),
(2) Date: Mar. 13, 2015

(87) PCT Pub. No.: WO2014/040711
PCT Pub. Date: Mar. 20, 2014

(65) Prior Publication Data
US 2015/0327080 A1 Nov. 12, 2015

(30) Foreign Application Priority Data

Sep. 13, 2012 (EP) .................................... 12360066

(51) Int. Cl.
*H04W 4/00* (2009.01)
*H04W 16/10* (2009.01)
(Continued)

(52) U.S. Cl.
CPC ........... *H04W 16/10* (2013.01); *H04W 16/32* (2013.01); *H04W 84/045* (2013.01)

(58) Field of Classification Search
None
See application file for complete search history.

(56) References Cited

U.S. PATENT DOCUMENTS 6,400,697 B1 6/2002 Leung et al.
2009/0047968 A1* 2/2009 Gunnarsson .......... H04W 48/12
455/446
(Continued)

FOREIGN PATENT DOCUMENTS

EP 2 077 685 A1 7/2009
EP 2 219 399 A1 8/2010
(Continued)

OTHER PUBLICATIONS

NEC, "HeNB Adaptive Frequency Selection," 3rd Generation Partnership Project (3GPP), 3GPP TSG-RAN WG4 Meeting #53, R4-094248, pp. 1-6, XP050393816, Jeju Korea, Nov. 9-13, 2009.
(Continued)

*Primary Examiner* — Phirin Sam
(74) *Attorney, Agent, or Firm* — Fay Sharpe, LLP (57) ABSTRACT

A small cell base station, a method, a computer program product and a wireless telecommunications network are disclosed. The small cell base station is deployable in a wireless telecommunications network in which a macro base station provides a first region of radio coverage using a first frequency band and a second region of radio coverage using a second frequency band, the first region of radio coverage comprising a plurality of angularly spaced first radio beams, the second region of radio coverage comprising at least a second radio beam, the second radio beam being arranged to radiate from the macro base station between adjacent angularly spaced first radio beams, the small cell base station comprising: transmission logic operable to provide a third region of radio coverage using a small cell frequency band, the small cell frequency band comprising one of the first frequency band and the second frequency band; reception logic operable to measure a signal quality of transmissions received from macro base stations using the first frequency band and the second frequency band and to identify as an
(Continued)

excluded frequency band that one of the first frequency band and the second frequency band which has a highest signal quality; and transmission frequency band selection logic operable to select as the small cell frequency band that frequency band other than the excluded frequency band. Through this approach both the macro base stations and the small cell base station can share frequency bands. By excluding the highest signal quality frequency band from the set and excluding that high-quality frequency band from being used by the small cell base station, the overall performance of the wireless telecommunications network is improved.

14 Claims, 7 Drawing Sheets

(51) Int. Cl.
   *H04W 16/32* (2009.01)
   *H04W 84/04* (2009.01)

(56) References Cited

U.S. PATENT DOCUMENTS

| | | | |
|---|---|---|---|
| 2009/0285113 | A1 | 11/2009 | Yavuz et al. |
| 2010/0008317 | A1* | 1/2010 | Bhattad ............... H04L 1/0003 370/329 |
| 2010/0111013 | A1 | 5/2010 | Chou |
| 2010/0130212 | A1* | 5/2010 | So ........................ H04W 36/08 455/444 |
| 2010/0323663 | A1* | 12/2010 | Vikberg ............... H04J 11/0093 455/410 |
| 2011/0014920 | A1* | 1/2011 | Nylander ............. H04W 36/20 455/442 |
| 2012/0244864 | A1* | 9/2012 | Fujii ................. H04W 36/0066 455/436 |
| 2013/0012249 | A1* | 1/2013 | Centonza .......... H04W 72/0426 455/501 |
| 2013/0337821 | A1* | 12/2013 | Clegg ................... H04L 5/0062 455/452.1 |
| 2014/0038598 | A1* | 2/2014 | Ren ....................... H04W 48/16 455/434 |

FOREIGN PATENT DOCUMENTS

| | | |
|---|---|---|
| EP | 2 426 974 A1 | 3/2012 |
| JP | 2002-112318 A | 4/2002 |
| JP | 2004-529524 A | 9/2004 |
| JP | 2009-530929 A | 8/2009 |
| JP | 2012-019257 A | 1/2012 |
| WO | WO 96/13952 A2 | 5/1996 |
| WO | WO 2008/093100 A2 | 8/2008 |

OTHER PUBLICATIONS

International Search Report for PCT/EP2013/002683 dated Dec. 11, 2013.

Holger Claussen et al., "Multi-carrier Cell Structures with Angular Offset", 2012 IEEE 23rd International Symposium on Personal, Indoor and Mobile Radio Communications—(PIMRC 2012), Sydney, Australia, Sep. 9-12, 2012, 8 pages.

* cited by examiner

Option 1: Individually fed dual column radome view from top

FIG. 4a

Option 2: 3-column radome + beam forming (BF)

view from top

FIG. 4b

Normalized antenna pattern of macrocell, $G_{max}$ = 15.5 dBi

- - - - - horizontal $f_1$
——— horizontal $f_2$
·········· vertical

Traditional multi-carrier configuration with co-channel small cells

Clean macrocell carrier 2 for fast moving users and users with high interference on shared carrier. Full frequency re-use of both carriers would lead to dropped calls for fast moving users that cannot handover fast enough New multi-carrier configuration with co-channel small cells Improved small cell performance and reduced impact on macrocells by deploying them in areas of low macro signal for each carrier. Retains property of clean carrier available at each location (to prevent call drops of fast moving users).

FREQUENCY BAND SELECTION

FIELD OF THE INVENTION

The present invention relates to a small cell base station, a method, a computer program product and a wireless telecommunications network.

BACKGROUND

Wireless telecommunication systems are known. In such systems, mobile communication devices (for example, mobile telephones) are operable to communicate with base stations provided by network providers.

In known wireless telecommunication systems, radio coverage is provided to network connectable devices, such as mobile telephones, or wireless devices such as iPads or other similar tablets, within areas known as cells. A base station is located in each cell to provide radio coverage. Typically, network connectable devices in each cell are operable to receive information and data from a base station and to transmit information and data to a base station.

User equipment roam through a wireless communications system. Base stations are typically provided which support areas of radio coverage. A number of such base stations are provided and are distributed geographically in order to provide a wide area of coverage to user equipment.

When user equipment is within an area served by a base station, communications may be established between the user equipment and the base station over associated radio links. Each base station typically supports a number of sectors within the geographical area of service. Typically, a different antenna within a base station supports each associated sector. Each base station has multiple antennas.

Traditional base stations provide coverage in relatively large geographical areas and those cells often referred to as macro cells. It is possible to provide a heterogeneous network where smaller sized cells are provided within macro cells. Such smaller sized cells are sometimes referred to as micro cells, pico cells or femto cells. One way to establish a small cell is to provide a small cell base station that provides coverage having a relatively limited range within the coverage area of the macro cell. The transmission power of a small cell base station is relatively low and, hence, each small cell provides a small coverage area compared to that of a macro cell and covers, for example, an office or a home.

Such small cells are typically provided where the communications coverage provided by the macro cell is poor or where a user wishes to use an alternative communications link provided locally, by the small cell base station, to communicate with the core network.

Although the deployment of such small cell base stations can provide advantages, unexpected consequences can occur.

Accordingly, it is desired to provide an improved technique for the deployment of small cell base stations.

SUMMARY

According to a first aspect, there is provided a small cell base station deployable in a wireless telecommunications network in which a macro base station provides a first region of radio coverage using a first frequency band and a second region of radio coverage using a second frequency band, the first region of radio coverage comprising a plurality of angularly spaced first radio beams, the second region of radio coverage comprising at least a second radio beam, the second radio beam being arranged to radiate from the macro base station between adjacent angularly spaced first radio beams, the small cell base station comprising: transmission logic operable to provide a third region of radio coverage using a small cell frequency band, the small cell frequency band comprising one of the first frequency band and the second frequency band; reception logic operable to measure a signal quality of transmissions received from macro base stations using the first frequency band and the second frequency band and to identify as an excluded frequency band that one of the first frequency band and the second frequency band which has a highest signal quality; and transmission frequency band selection logic operable to select as the small cell frequency band that frequency band other than the excluded frequency band.

The first aspect recognizes that the deployment of the small cells within, for example, macro cells can affect the performance of the heterogeneous wireless telecommunications network. In particular, the first aspect recognizes that it may be desirable to provide a network where small cells provide the main capacity, with macro cells providing area coverage and filling coverage gaps between the small cells. To enable the small cells to operate and provide high-capacity for hotspots, it is possible to provide these small cells on a separate frequency band to that being used by the macro cell. However, this limits the number of carriers available for macro cellular traffic, which is undesirable. The co-channel operation of macro cells and small cells can improve the spectral efficiency, but interference between small cells and macro cells needs to be considered. For outdoor deployment, the interference issues are more severe than for residential small cell deployments due to building shielding effects of walls and higher demand on mobility for hotspot coverage. It is possible to provide partial reuse of frequencies, where small cells reuse part of the spectrum used by macro cells, which can to some extent overcome interference and mobility issues, but this still leads to performance shortfalls. In particular, the use of separate channels avoids interference between small cells and the existing macro cells, but the major drawback is that this limits the macro cell capacity (which may already be the limiting factor for network performance) and that spectral efficiency per area is low. Also, although it is possible for the network to configure reuse of all frequency bands used both by macro cells and by small cells in order to improve spectral efficiency through higher frequency reuse, the macro cell performance and small cell is degraded, resulting in uneven throughput distribution. In addition, this arrangement leads to an increased number of dropped calls since fast moving users cannot always handover quickly enough to a small cell it may be passing through. The partial reuse of carriers is a good compromise and provides good spectral efficiency without encountering mobility problems. However, there are still shortfalls in terms of locations where small cells can be deployed effectively (such as a requirement for a minimum distance between the small cells and the macro cells).

Accordingly, a small cell base station is provided. The small cell base station may be deployable in a wireless telecommunications network. The wireless telecommunications network may include micro base stations, each of which may provide a first region of radio coverage using a first frequency band and a second region of radio coverage using a second frequency band. The first region of radio coverage may comprise a plurality of angularly spaced first radio beams and the second region of radio coverage may comprise at least a second radio beam. The second radio beam may be arranged radiate from the macro base station between adjacent angularly spaced first radio beams. This is an arrangement whereby the first and second radio beams are angularly inter-spaced and radiate radially from the macro base station. The small cell base station may comprise transmission logic which provides a third region of radio coverage using a small cell frequency band. Small cell frequency band may be either the first frequency band or the second frequency band. The small cell base station may also comprise reception logic which measures a quality of transmissions received from, for example, macro base stations using the first frequency band and/or the second frequency band. The reception logic may also identify an excluded frequency band from the first frequency band and the second frequency band. The excluded frequency band may be the one of the first frequency band and the second frequency band having a highest signal quality. Once the excluded frequency band has been identified, the transmission frequency band selection logic may select a frequency band for use by the small cell which is not the excluded frequency band.

Accordingly, through this approach both the macro base stations and the small cell base station can share frequency bands. That is to say that the set of frequency bands used by the macro base station may also be the same set of frequency bands that may be used by the small cell base station. By excluding the highest signal quality frequency band from the set and excluding that high-quality frequency band from being used by the small cell base station, the overall performance of the wireless telecommunications network is improved. In particular, a cell structure is produced where all areas may be covered by macro cells and small cells and both small cell and macro cell performance increases compared to traditional co-channel deployments. The small cell performance increases because the small cell base stations only use the frequency band on which the macro cell signal received is at a lower quality (which is typically not in the direction of the maximum antenna gain). This results in improved coverage and more flexibility regarding the distance to the macro cell that a small cell can be deployed effectively. In addition, macro cell performance increases since each location is served only by the frequency band where the macro cell antenna provides the highest gain, which avoids regions of high interference between sectors. In addition, because small cells only reuse these areas where the macro cell does not serve users on that frequency band, there is very little interference impact from co-channel small cells. It will be appreciated that this cell structure retains useful property that at each location one macro cell frequency band is "clean" from small cell interference and due to the geographical reuse, any fast-moving macro cell user does not need to hand over to a small cell, but can instead move through it on the clean macro cell frequency band. This prevents dropped calls due to handover delays for fast moving users.

In one embodiment, the macro base station provides further regions of radio coverage using at least one further frequency band and the small cell frequency band comprises at least one of the first frequency band, the second frequency band and the at least one further frequency band, and wherein: the reception logic is operable to measure a signal quality of received transmissions from macro base stations using the first frequency band, the second frequency band and at least one further frequency band and to identify as the excluded frequency band that one of the first frequency band, the second frequency band and at least one further frequency band which has a higher signal quality; and the transmission frequency band selection logic is operable to select as the small cell frequency band at least one of those frequency bands other than the excluded frequency band. Hence, in embodiments where the set of frequency bands used by the macro base station is more than two, the reception logic may measure a signal quality of each of those frequency bands and identify the frequency band having the strongest signal quality within that set of frequency bands as being the excluded frequency band. The transmission frequency band selection logic may then select one or more frequency bands for use by the small cell base station which does not include the excluded frequency band. For example, the transmission frequency band selection logic may select the frequency band with the worst measured signal quality and then the next worst, and so on. Again, this enables the small cell base station to utilize frequency bands other than that frequency band which is most likely to cause co-channel interference with the macro cell.

In one embodiment, the transmission frequency band selection logic is operable to select as the small cell frequency band that one of those frequency bands other than the excluded frequency band which has a lowest signal quality. Accordingly, the transmission frequency band selection logic may select that frequency band which has been measured to have the lowest signal quality for transmissions by the small cell base station.

In one embodiment, the transmission frequency band selection logic is operable to select as the small cell frequency band all of those frequency bands other than the excluded frequency band. Accordingly, the small cell base station may select a group of frequency bands as a subset for use in transmissions which does not include the excluded frequency band.

In one embodiment, the reception logic is operable to measure the signal quality based on at least one of a signal to noise plus interference ratio, a ratio of a pilot power to a total cell power and pilot power of received transmissions.

In one embodiment, the frequency band comprises one of a carrier or groups of subcarriers.

According to a second aspect, there is provided a method of configuring a small cell base station deployable in a wireless telecommunications network in which a macro base station provides a first region of radio coverage using a first frequency band and a second region of radio coverage using a second frequency band, the first region of radio coverage comprising a plurality of angularly spaced first radio beams, the second region of radio coverage comprising at least a second radio beam, the second radio beam being arranged to radiate from the macro base station between adjacent angularly spaced first radio beams, the method comprising: measuring a signal quality of transmissions received from macro base stations using the first frequency band and the second frequency band and identifying as an excluded frequency band that one of the first frequency band and the second frequency band which has a highest signal quality; selecting as the small cell frequency band that frequency band other than the excluded frequency band; and providing a third region of radio coverage using a small cell frequency band.

In one embodiment, the macro base station provides further regions of radio coverage using at least one further frequency band and the small cell frequency band comprises at least one of the first frequency band, the second frequency band and the at least one further frequency band, and wherein: the step of measuring comprises measuring a signal quality of received transmissions from macro base stations using the first frequency band, the second frequency band and at least one further frequency band and identifying as the excluded frequency band that one of the first frequency band, the second frequency band and at least one further frequency band which has a higher signal quality; and the step of selecting comprises selecting as the small cell frequency band at least one of those frequency bands other than the excluded frequency band.

In one embodiment, the step of selecting comprises selecting as the small cell frequency band that one of those frequency bands other than the excluded frequency band which has a lowest signal quality.

In one embodiment, the step of selecting comprises selecting as the small cell frequency band all of those frequency bands other than the excluded frequency band.

In one embodiment, the step of measuring comprises measuring the signal quality based on at least one of a signal to noise plus interference ratio, a ratio of a pilot power to a total cell power and pilot power of received transmissions.

In one embodiment, the frequency bands comprise at least one of carriers and groups of sub-carriers.

According to a third aspect, there is provided a computer program product operable, when executed on a computer, to perform the method steps of the first aspect.

According to a fourth aspect, there is provided a wireless telecommunications network comprising: at least one macro base station operable to provide a first region of radio coverage using a first frequency band and a second region of radio coverage using a second frequency band, the first region of radio coverage comprising a plurality of angularly spaced first radio beams, the second region of radio coverage comprising at least a second radio beam, the second radio beam being arranged to radiate from the macro base station between adjacent angularly spaced first radio beams; and at least one small cell base station comprising: transmission logic operable to provide a third region of radio coverage using a small cell frequency band, the small cell frequency band comprising one of the first frequency band and the second frequency band; reception logic operable to measure a signal quality of transmissions received from macro base stations using the first frequency band and the second frequency band and to identify as an excluded frequency band that one of the first frequency band and the second frequency band which has a highest signal quality; and transmission frequency band selection logic operable to select as the small cell frequency band that frequency band other than the excluded frequency band.

In one embodiment, the macro base station provides further regions of radio coverage using at least one further frequency band and the small cell frequency band comprises at least one of the first frequency band, the second frequency band and the at least one further frequency band, and wherein: the reception logic is operable to measure a signal quality of received transmissions from macro base stations using the first frequency band, the second frequency band and at least one further frequency band and to identify as the excluded frequency band that one of the first frequency band, the second frequency band and at least one further frequency band which has a higher signal quality; and the transmission frequency band selection logic is operable to select as the small cell frequency band at least one of those frequency bands other than the excluded frequency band.

In one embodiment, the transmission frequency band selection logic is operable to select as the small cell frequency band that one of those frequency bands other than the excluded frequency band which has a lowest signal quality.

In one embodiment, the transmission frequency band selection logic is operable to select as the small cell frequency band all of those frequency bands other than the excluded frequency band.

In one embodiment, the reception logic is operable to measure the signal quality based on at least one of a signal to noise plus interference ratio, a ratio of a pilot power to a total cell power and pilot power of received transmissions.

In one embodiment, the frequency bands comprise at least one of carriers and groups of sub-carriers.

In one embodiment, the second region of radio coverage comprises a plurality of angularly spaced second radio beams.

In one embodiment, each of the angularly spaced second radio beams is arranged to radiate from the base station between adjacent angularly spaced first radio beams.

In one embodiment, the second radio beam is arranged to radiate from the base station to bisect an angle between adjacent angularly spaced first radio beams.

In one embodiment, the base station supports an identical number of first and second radio beams.

In one embodiment, the base station is operable to provide a third region of radio coverage on a third radio frequency, the third radio beam being arranged to radiate from the base station between adjacent angularly spaced first radio beams.

In one embodiment, the base station comprises a first antenna operable to transmit at least one of the angularly spaced first radio beams, and a second antenna operable to transmit the second radio beam.

In one embodiment, at least one of the first and second antenna comprises an antenna column.

In one embodiment, at least one of the first and second antenna comprises an antenna array.

In one embodiment, the first and second antenna are physically angled with respect to one another.

In one embodiment, at least one of the first and second antenna comprises an antenna array operable to form at least one of the first and second beams by beam forming techniques.

In one embodiment, the first and second antenna comprise a single antenna array operable to form at least one of the first and at least one of the second beams.

In one embodiment, the first and second radio frequencies comprise different radio carriers.

In one embodiment, the first and second radio frequencies comprise at least one sub-carrier within a single radio carrier.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Overview

Figure 3:
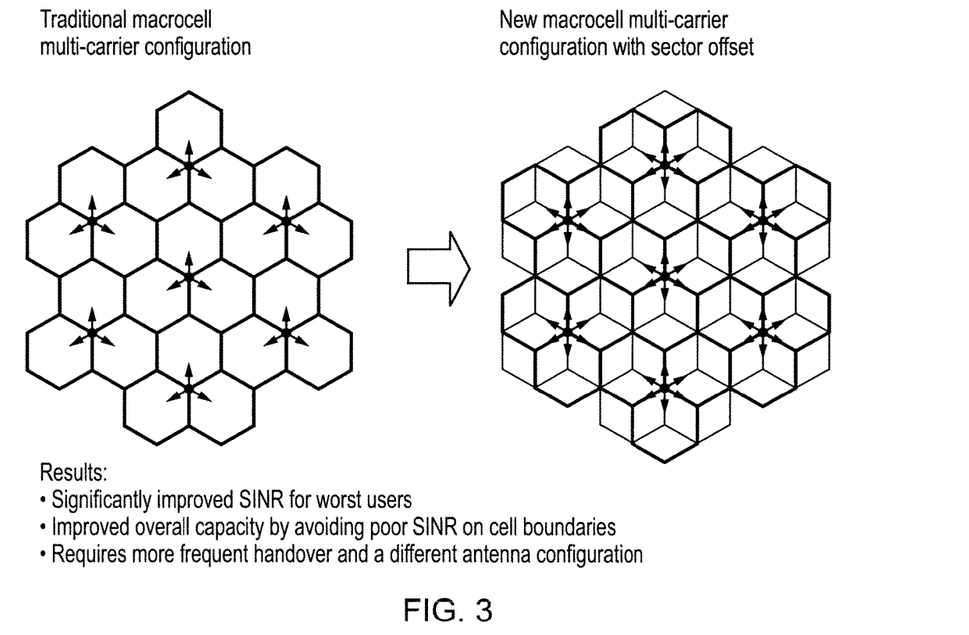
FIG. 3 illustrates schematically a multi-cell set-up in both a traditional and alternative cell configuration.

Before discussing the embodiments in any more detail, first an overview will be provided. Embodiments provide for the selection of appropriate frequency bands to improve the performance of a heterogeneous wireless network where macro cells are configured as shown in FIG. 3 (right hand side) as will be described in more detail below. This arrangement is different from current macro cell configurations where sectors for all carriers overlap as shown in FIG. 3 (left hand side). The sector-offset cell structure is beneficial for pure macro cell deployments, but has further advantages in this heterogeneous wireless network configuration.

Figure 7:
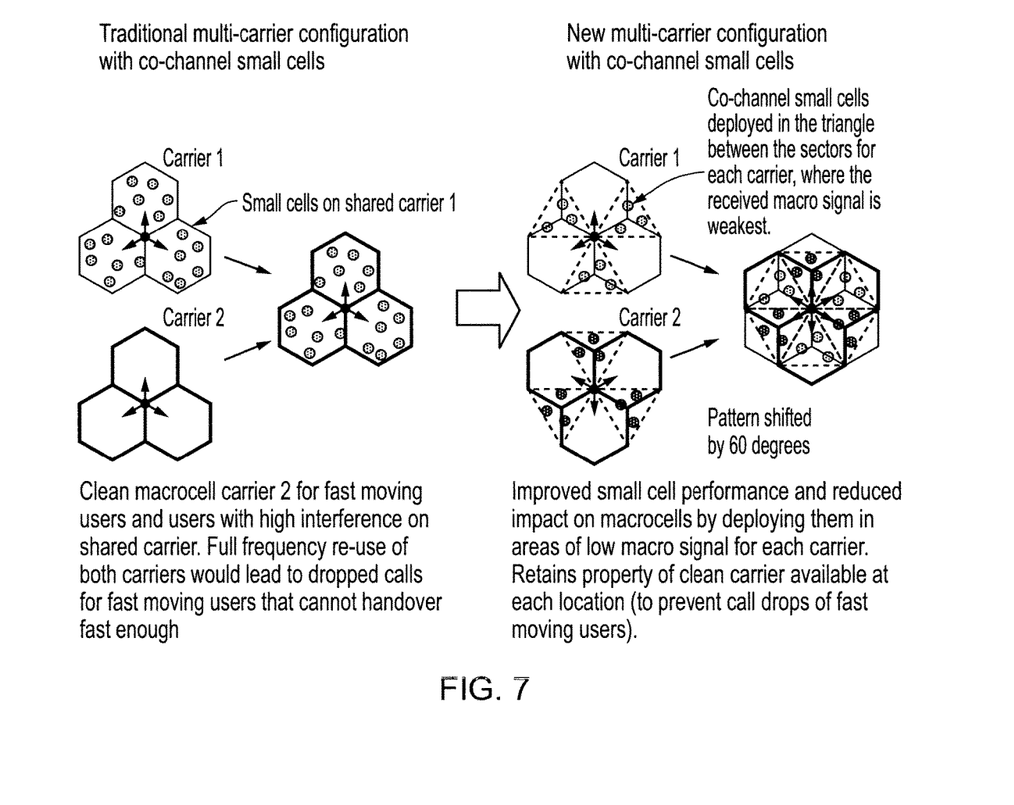
FIG. 7 illustrates a comparison between the configuration of a multi-carrier network of embodiments and a conventional approach.

Small cells are configured such that they always re-use only one frequency band at a time, dependent on the location with respect to the macro cell. This is illustrated in FIG. 7 (right hand side) compared to the conventional shared carrier configuration shown in FIG. 7 (left hand side). The shading denotes the carrier used by macro cells and small cells (red=carrier 1, blue=carrier 2).

The arrangement keeps one macro cell carrier "clean" (i.e. that carrier is not shared with small cells at this location) to prevent dropped calls from fast moving users due to handover delays. If one clean carrier is available at each location, and fast moving users are served by that clean carrier, handover problems can be avoided. This cell structure retains this useful property of a clean macro cell carrier at each location.

This configuration can be achieved by an auto-configuration process through the following steps:
(1) The small cell performs measurements of the macro cell signal quality on both (or all) frequency bands or carriers (for example SINR, Ec/Io, or Pilot power);
(2) The small cell determines the maximum value measured on each frequency band;
(3) The small cell selects the frequency band with the lowest measured maximum value for its own transmissions.

Figure 8:
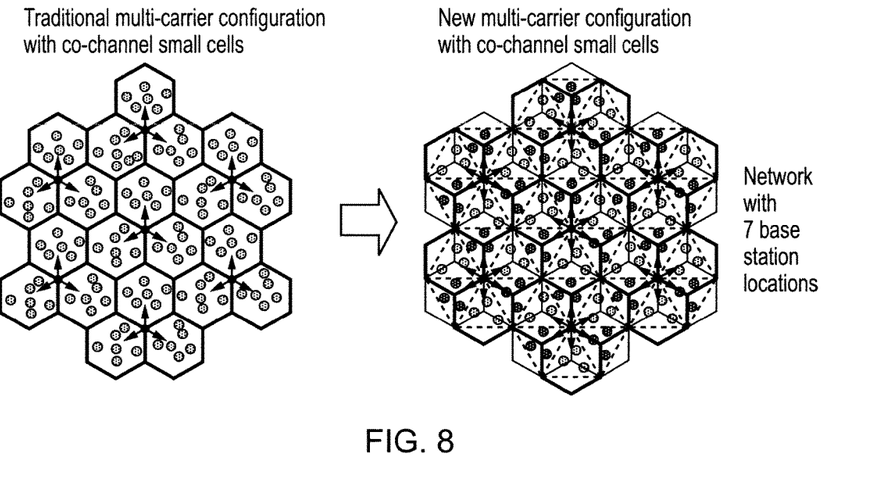
FIG. 8 illustrates a comparison between the resultant configuration of a multi-carrier network of embodiments and a conventional approach.
Figure 9:
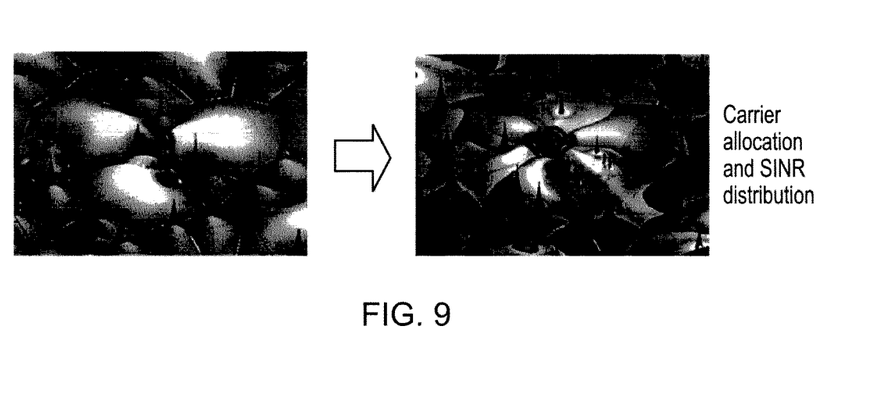
FIG. 9 illustrates a SINR distribution and frequency allocation for the network of embodiments for 7 macro cell sites and a comparison with a conventional approach.

An example of the resulting structure is shown in FIG. 8 (right hand side). An example of the resulting SINR distribution and carrier allocation is shown in FIG. 9 (right hand side).

This approach provides a method configuring the cellular structure and frequency configuration of both macro cell and small cells that solves the existing interference issues and allows full frequency re-use. The structure can improve the cellular network throughput by up to 130% average and 200% edge user throughput compared to a dedicated carrier reference deployment, and can also significantly outperform partial frequency re-use deployments.

Wireless Telecommunications Network

Figure 1:
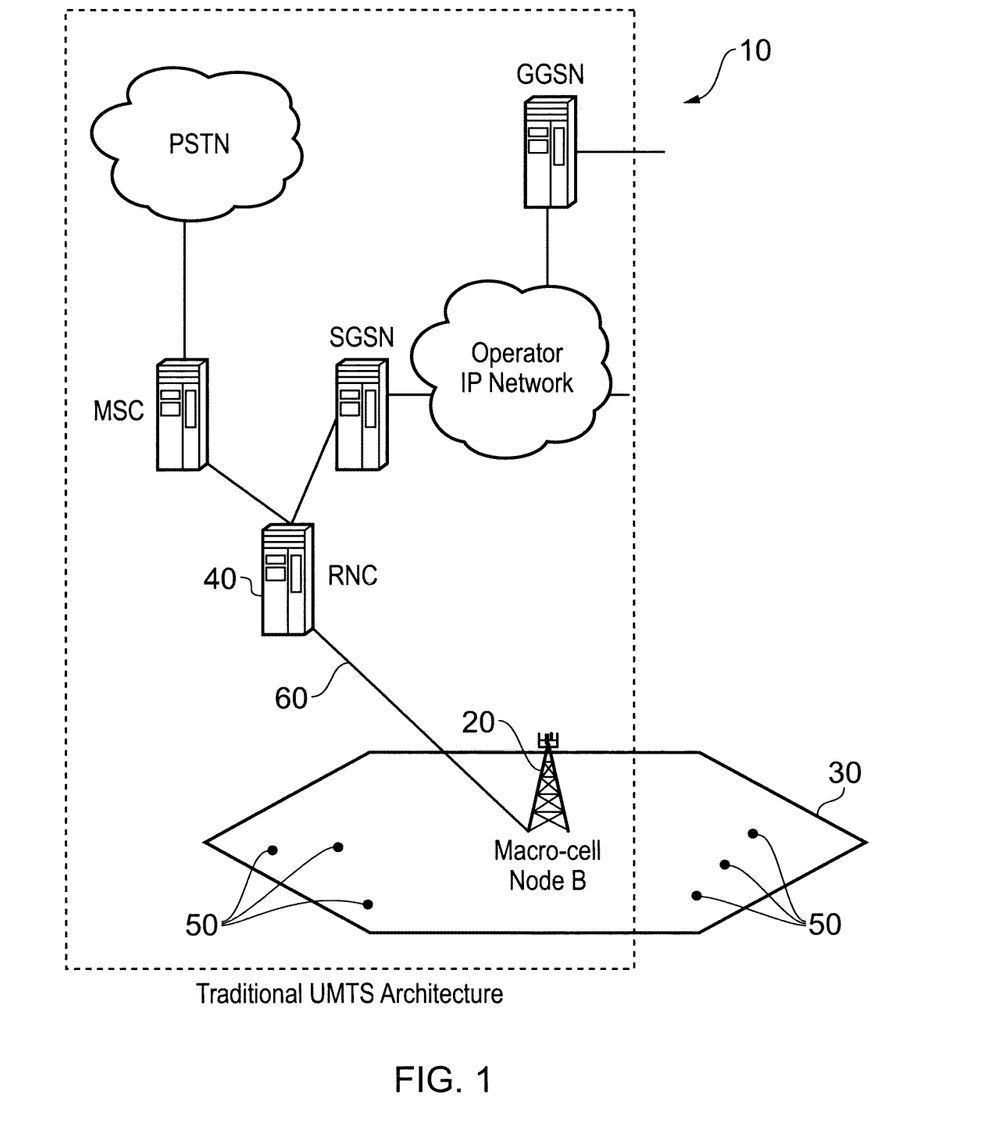
FIG. 1 illustrates the main components of a telecommunications network according to one embodiment.

FIG. 1 illustrates schematically the main components of a wireless telecommunications network 10 according to one embodiment. User equipment 50 roam through the wireless telecommunications system. Base stations 20 are provided which support areas of radio coverage 30. A number of such base stations 20 are provided and are distributed geographically in order to provide a wide area of coverage to user equipment 50.

When user equipment is within an area served by a base station 30, communications may be established between the user equipment and the base station over associated radio links. Each base station typically supports a number of sectors within the geographical area of service 30.

Typically, a different antenna within a base station supports each associated sector. Each base station 20 has multiple antennas. It will be appreciated that FIG. 1 illustrates a small subset of a total number of user equipment and base stations that may be present in a typical communication network.

One issue in cellular networks is an uneven distribution of signal to interference and noise ratio across a cell. Cells are supported by base stations in a manner which leads to very high data rates being achievable in a cell centre, but very poor data rates at a cell edge and between sectors of a cell. A typical three sector cell being supported by a base station and a series of adjacent base stations being provided across a geographical area results in a poor signal to noise and interference ratios resulting in poor data rates at the cell edge and between sectors.

The interference issue can be addressed in LTE by coordinating interference such that parts of available frequency bands such, carriers or sub-carriers are reserved for edge users, thereby increasing the available signal to interference and noise ratio for those edge users. One drawback of such an arrangement is that it reduces frequency re-use within a wireless communication network and thus may act to sacrifice overall network capacity. Another way to increase cell edge rates would be to incorporate static frequency planning when configuring a network and arranging to use different carriers in neighbouring cells. In this way, the cell edge signal to interference and noise ratios may be improved by planning frequencies in a way that neighbouring cells use different carriers. Such an approach may typically be used in GSM networks. Such an arrangement typically reduces frequency re-use factor and can lead to a low spectral efficiency across a given geographical area.

In flexible systems such as LTE interference may be coordinated. Such coordination typically offers a more dynamic interference mitigation approach compared to static frequency planning. By reserving part of the spectrum for cell edge users and by 3o incorporating clever scheduling in network operation, the overall operation of a network may be enhanced by giving up some overall capacity. By reserving part of the spectrum it will be understood that a lower frequency re-use factor is employed and overall cell performance is sacrificed for the benefit of edge users. It will be appreciated however, that interference coordination methods may not be used in some network architectures such as UMTS and CDMA 2000.

Some networks are operable to perform in a multiple input multiple output (MIMO) manner and thus joint transmissions of multiple base stations add up at an end user in a constructive way such that signal to interference and noise ratio is maximised. According to such methods, transmissions on two bands of frequency may be employed, and typically two or more antennas may be required to support appropriate transmissions in each sector of a base station.

It is recognised that if multiple carriers are available at a base station, which is the case in most areas and for most operators, an alternative cell configuration may be implemented which may significantly improve cell edge data rates and overall data rates.

For a three sector macro cell, aspects provide a second carrier, the sectors of which are shifted such that they point towards an area of poor performance in a first carrier, for example, those sectors are radially shifted so that they radiate "between" sectors of the first carrier. In the case of a three sector macro cell, it may be, for example, that main beams, or beam patterns, supporting the sectors of radio coverage on the second carrier are shifted by 60° with respect to the beam patterns supporting the sectors of coverage on the first carrier. Such a shift in sectors may require modified antennas, but the cost increase is small compared to resulting benefits. As a result of shifting the beam pattern of a second carrier in relation to a first carrier, regions of poor signal to interference and noise ratio, both between the sectors and at cell edges of a particular base station, are arranged such that they are no longer co-located in comparison to a typical co-located carrier deployment. In other words, the regions of poor coverage in each carrier no longer overlap.

It will be appreciated that user equipment, for example, mobile telephones, operate such that they are typically supported, by handover, or camping procedures, to a best available carrier in any given geographical location. That is to say, the carrier which the user equipment sees as having the highest signal to interference and noise ratio or the highest received power at the user equipment is seen as being the most attractive for service. Providing a second carrier which is arranged so that it offers a higher signal to interference and noise ratio than a first carrier in some regions of a cell can lead to a significant increase in user data rates, particularly at cell edges, without reducing frequency re-use factor which remains at complete re-use.

The general principle may be extended to any number of sectors and any number of carriers or sub-carriers and may be generally applicable to different network provision protocols and air interfaces such as UMTS, CDMA and LTE.

Sector Offset Arrangement

Figure 2:
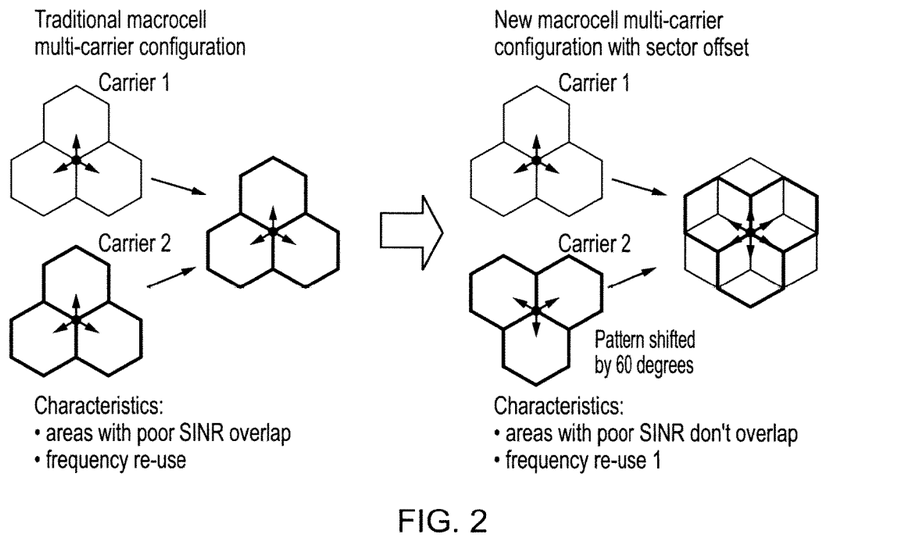
FIG. 2 illustrates schematically traditional and alternative single multi-carrier base station set-ups for a base station having three sectors and also shows the (alternative) offset configuration for macro cells (right-hand side picture)

FIG. 2 illustrates both a traditional base station configuration and a multi-frequency band (carrier or sub-carrier) base station set-up. In the scenarios illustrated schematically in FIG. 2, two carriers are provided. Each carrier provides coverage to a geographical area in three sectors. In the traditional implementation shown on the left-hand side of FIG. 2, carriers 1 and 2 are provided such that their beam patterns are substantially collocated, and directed in substantially identical directions, leading to an overall multi carrier configuration in which areas of poor signal to noise and interference ratio are experienced on both carriers in substantially the same geographic locations. Namely: between sectors and at the base station cell edge.

On the right-hand side of FIG. 2 an alternative configuration of carriers is illustrated schematically. In this scenario, the main beam supporting each sector of carrier 1 is offset in relation to the main beam supporting each sector of the second carrier. That is to say, as illustrated in FIG. 2, the beam pattern of carrier 2 is shifted by 60° in relation to the beam pattern supported on carrier 1. The sectors are therefore offset with respect to one another. It will, however, be appreciated that sectors are merely a simplified construct when considering base station coverage geometry and that each sector is supported by a main beam radiating from a base station as part of a more complex beam pattern.

Because of the relative sector offset of embodiments described herein, areas with poor signal to interference and noise ratio experienced on a first carrier and a second carrier tend to overlap less than in a traditional arrangement whilst full frequency re-use across adjacent base stations and cells within a network is enabled.

FIG. 3 illustrates schematically network setup according to an embodiment, that network comprising a plurality of base stations, each supporting cells of radio coverage. As a result of providing each base station shown in FIG. 3 with two carriers and as a result of offsetting the beam pattern of the second carrier with respect to the first at each base station, a resulting region of radio coverage may be provided within a network which provides a significant improvement in signal to interference and noise ratio for those users at cell edges and provides an improved overall network capacity by avoiding poor signal to interference and noise ratio in relation to cell and sector boundaries. It will be appreciated that such an arrangement may require more frequent handover or cell selection processes to occur within a network, both intra-cell between cells supported by a single base station and inter-cell between cells supported by different base stations. It will also be appreciated that aspects described herein typically require a new antenna configuration in order to provide such a multi carrier configuration having sector offsets at each base station.

It will be appreciated that to achieve different carrier offset patterns for different carriers, antenna systems provided on a base station and the RF stage of a base station may need appropriate modification. There are various ways in which to achieve the required carrier offset patterns.

Figure 4A:
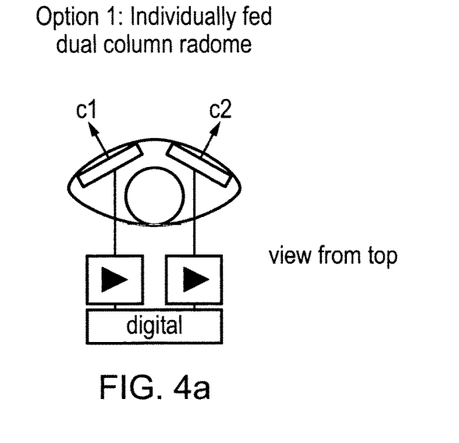
FIG. 4 illustrates schematically two antenna implementation approaches according to some embodiments.
Figure 4B:
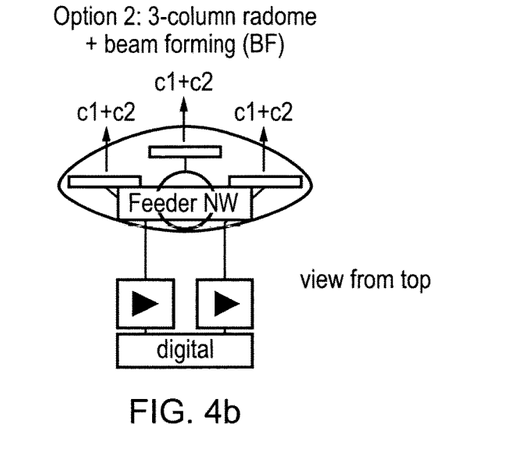

FIG. 4 illustrates schematically two possible implementation approaches.

One option is that the beam patterns for each sector may be achieved using a radome including two angled individually fed antenna columns, one provided for each carrier. In such an arrangement, two signals (one for each carrier) are required and two RF paths are required. Each RF path needs only to provide half of the power in comparison to an arrangement which uses one amplifier to support both bands.

Furthermore, it will be appreciated that some possible antenna array arrangements may already integrate separate RF paths for each antenna element and those may be digitally fed. That is to say, an existing antenna array may be able to support the proposed scheme of providing a different or offset beam pattern for each carrier in a sector. It will be further appreciated that for LTE and 4G networks, multiple RF paths will typically be required to support standardised MIMO schemes.

FIG. 4 also illustrates schematically an implementation in which different patterns for each carrier are provided via a beam-forming approach using a multi column array. Compared to the first implementation, two broadband RF stages may be used, each at half power. In addition, a feeder network is required at the antenna to feed each of the four columns.

Figure 5:
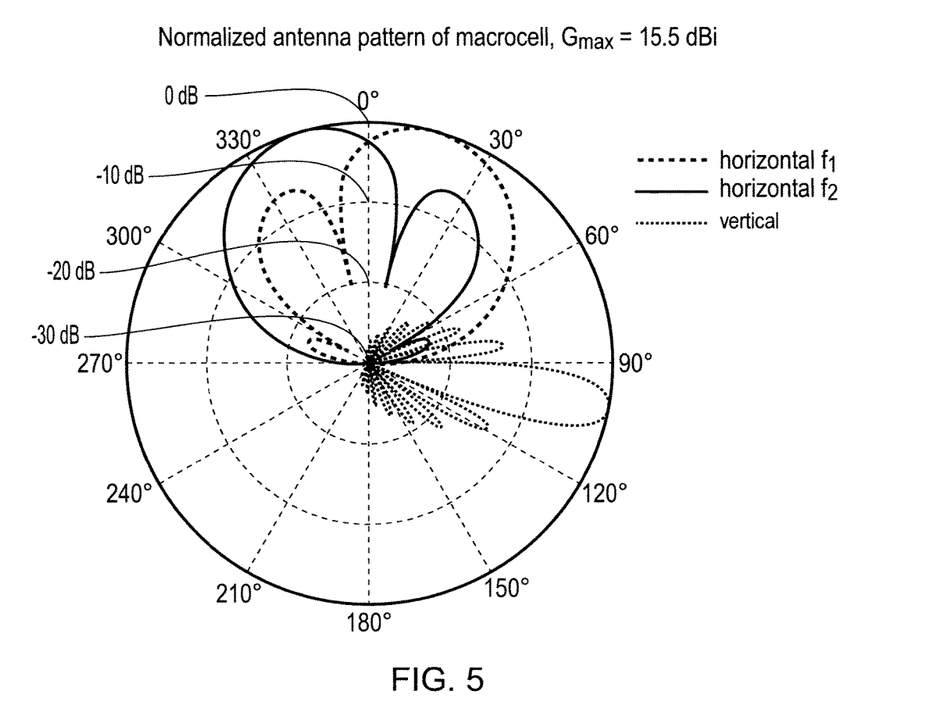
FIG. 5 illustrates schematically an offset antenna pattern using a three column array.

FIG. 5 illustrates schematically an offset antenna pattern which may be achieved using a three column array such as that shown schematically in FIG. 4. It can be seen that the beams formed by the three column array are substantially offset with respect to one another and, in the case illustrated, that offset is of the region of 60°.

It will be understood that each of the implementation approaches illustrated schematically in FIG. 4 may fit into standard radome sizes and thus do not increase the visual impact of a base station antenna system.

Small Cell Frequency Band Selection

Figure 6:
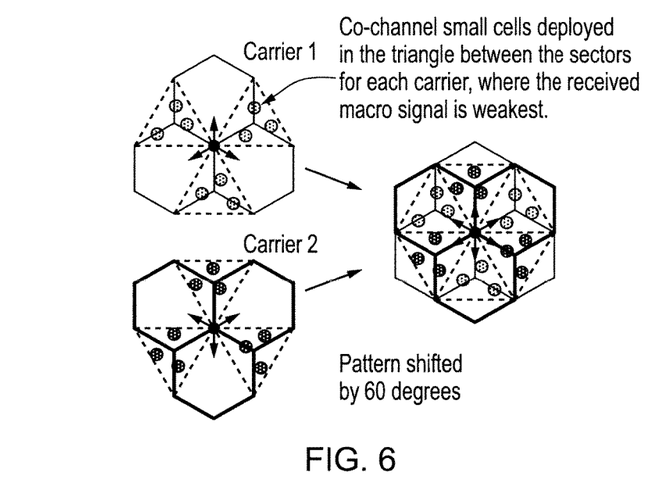
FIG. 6 illustrates the joint configuration of macro cells and small cells in a multiple frequency band or multicarrier deployment according to one embodiment.

The joint configuration of macro cells and small cells in a multiple frequency band or multicarrier deployment as illustrated in FIG. 6.

Both (or all) frequency bands or carriers are used by the macro cells. For small cells, only one (or all except one) carrier is re-used dependent on the location of the small cell with respect to the macro cell. The overall configuration is achieved by the following steps:

(1) On carrier 1 (shaded red in FIG. 6) small cells use this carrier only in the area (shown as a triangle) between the macro cell sectors, where the macro cell performance is poor due to interference due to frequency re-use between those sectors. In addition, the power received from the macro cell in this area is lower compared to the other areas since these are offset from the direction of the highest antenna gain from the macro cell. As a result, small cells with low power perform well even when deployed relatively close to the macro cell.

(2) On Carrier 2 (shaded blue in FIG. 6), the macro cell antenna pattern is offset such that for each sector the direction of maximum gain points towards the inter-sector boundary between two sectors on Carrier 1.

(3) On Carrier 2 (shaded blue in FIG. 6) small cells small cells are configured the same way in the area between the sectors as in (1). This combination of macro cell carriers with the small cell configuration of embodiments results in advantageous properties for both small cells and macro cells.

(4) Cell selection is configured such that small cells are prioritized when their SINR or pilot Ec/Io exceeds a pre-defined value to maximize offloading of user equipment to small cells.

Performance Comparison

System level simulations were performed to compare the performance of the configuration of the embodiments mentioned above with existing alternatives such as a separate carrier configuration and a partially shared carrier configuration. For the partially shared carrier reference, the macro cell power on the shared carrier was reduced by 10 dB for improved overall performance. The number of carriers and base stations are the same for all compared cases. Different densities of small cells were simulated.

Figure 10:
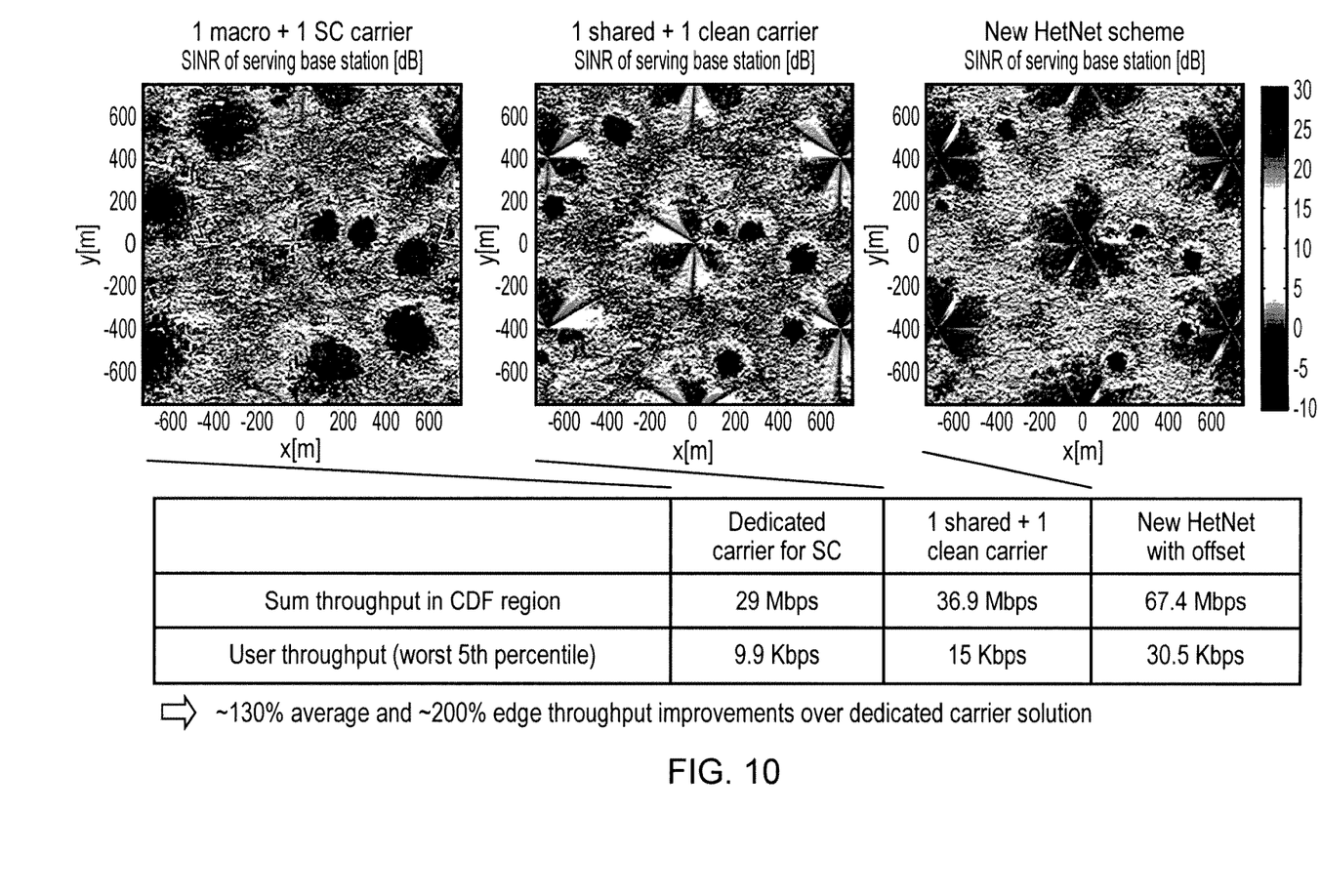
FIG. 10 illustrates a performance comparison of the network of embodiments with alternatives for low density small cell deployments.

FIG. 10 shows the performance comparison and SINR distributions for low density small cell deployments. It is shown that the structure of embodiments with the sector offset outperforms separate carrier deployments by 130% average and 200% for cell edge throughput. Compared to existing partially shared carrier configurations, embodiments provide 80% average and 100% cell edge rate improvements. This improvement can also clearly be seen in the SINR distributions where embodiments significantly reduce the areas of poor SINR.

Figure 11:
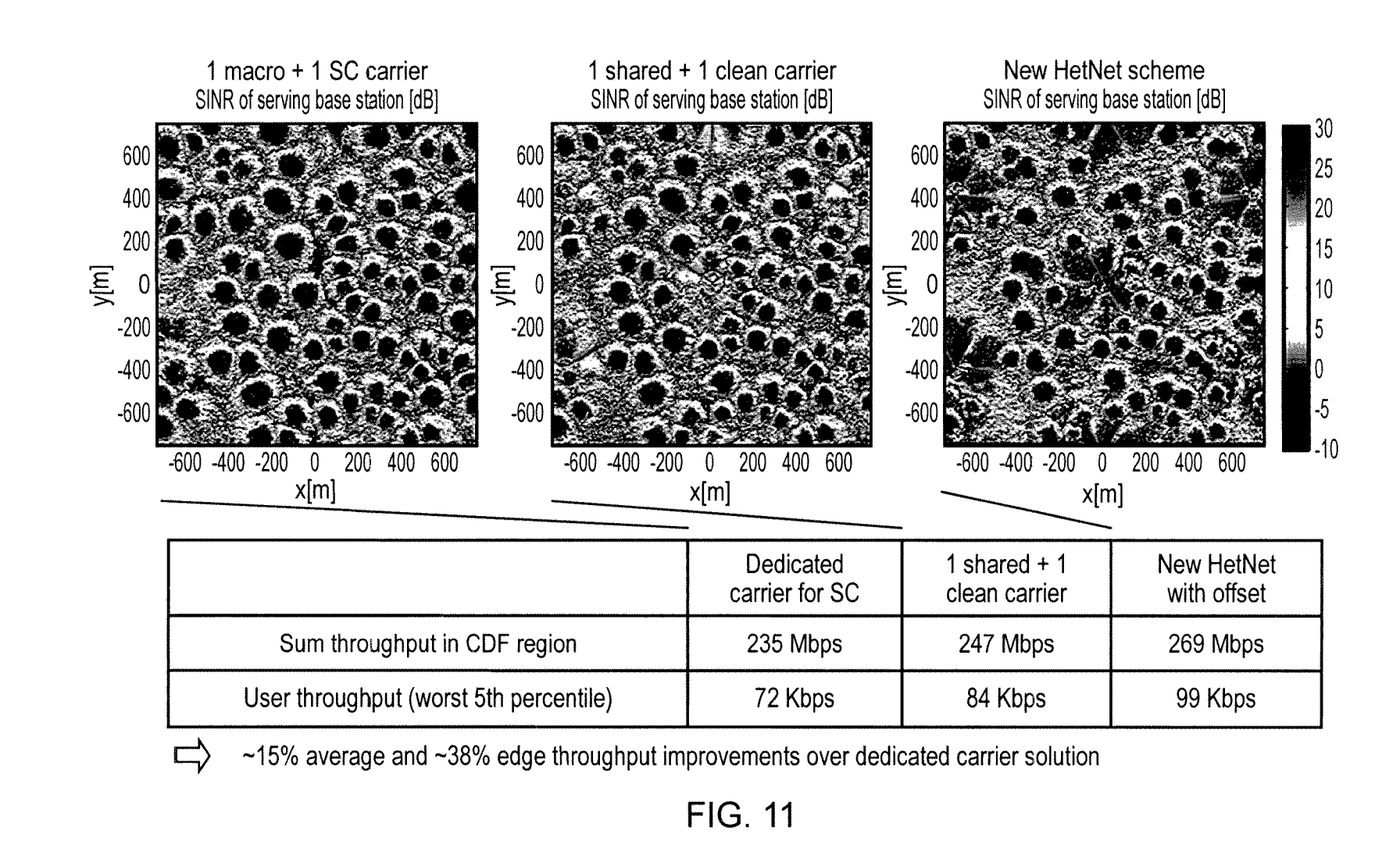
FIG. 11 illustrates a performance comparison of the network of embodiments with alternatives for high density small cell deployments.

FIG. 11 shows the performance comparison for a high density small cell deployment. Here the overall performance is nearly completely dominated by the high number of small cells which nearly provide full area coverage. As a result, the differences between the schemes becomes smaller. However the configuration of embodiments remains the best. When looking at the SINR distributions it can be seen that the macro cell performance in embodiments is much better than in the other schemes (see areas of high SINR around the macro cell locations).

Accordingly, it can be seen that embodiments provide cell structure which:

Significantly increases performance compared to existing cell structures (up to 130% average and 200% edge throughput improvements);

Retains the useful property that at each location a clean macro cell carrier is available to prevent handover failures for fast moving users;

Improves flexibility of deployment locations for small cells since they see less interference from the macro cell due to their location based carrier allocation;

Does not require load balancing between macro carriers, as in partially shared carrier configuration A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A small cell base station deployable in a wireless telecommunications network in which a macro base station provides a first region of radio coverage using a first frequency band and a second region of radio coverage using a second frequency band, said first region of radio coverage comprising a plurality of angularly spaced first radio beams, said second region of radio coverage comprising at least a second radio beam, said second radio beam being arranged to radiate from said macro base station between adjacent angularly spaced first radio beams, said small cell base station comprising:
   a transmitter configured to provide a third region of radio coverage using a small cell frequency band, said small cell frequency band comprising one of said first frequency band and said second frequency band;
   a receiver configured to measure a signal quality of transmissions received from macro base stations using said first frequency band and said second frequency band and to identify as an excluded frequency band that one of said first frequency band and said second frequency band which has a highest signal quality; and
   a transmission frequency band selection processor configured to select as said small cell frequency band that frequency band other than said excluded frequency band.

2. The small cell base station of claim 1, wherein said macro base station provides further regions of radio coverage using at least one further frequency band and said small cell frequency band comprises at least one of said first frequency band, said second frequency band and said at least one further frequency band, and wherein:
   said receiver is configured to measure a signal quality of received transmissions from macro base stations using said first frequency band, said second frequency band and at least one further frequency band and to identify as said excluded frequency band that one of said first frequency band, said second frequency band and at least one further frequency band which has a higher signal quality; and
   said transmission frequency band selection processor is configured to select as said small cell frequency band at least one of those frequency bands other than said excluded frequency band.

3. The small cell base station of claim 1, wherein said transmission frequency band selection processor is configured to select as said small cell frequency band that one of those frequency bands other than said excluded frequency band which has a lowest signal quality.

4. The small cell base station of claim 1 wherein said transmission frequency band selection processor is configured to select as said small cell frequency band all of those frequency bands other than said excluded frequency band.

5. The small cell base station of claim 1, wherein said reception processor is configured to measure said signal quality based on at least one of a signal to noise plus interference ratio, a ratio of a pilot power to a total cell power and pilot power of received transmissions.

6. The small cell base station of claim 1, wherein said frequency bands comprise at least one of carriers and groups of sub-carriers.

7. A method of configuring a small cell base station deployable in a wireless telecommunications network in which a macro base station provides a first region of radio coverage using a first frequency band and a second region of radio coverage using a second frequency band, said first region of radio coverage comprising a plurality of angularly spaced first radio beams, said second region of radio coverage comprising at least a second radio beam, said second radio beam being arranged to radiate from said macro base station between adjacent angularly spaced first radio beams, said method comprising:
   measuring a signal quality of transmissions received from macro base stations using said first frequency band and said second frequency band and identifying as an excluded frequency band that one of said first frequency band and said second frequency band which has a highest signal quality;
   selecting as said small cell frequency band that frequency band other than said excluded frequency band; and
   providing a third region of radio coverage using a small cell frequency band.

8. The method of claim 7, wherein said macro base station provides further regions of radio coverage using at least one further frequency band and said small cell frequency band comprises at least one of said first frequency band, said second frequency band and said at least one further frequency band, and wherein:
   said measuring comprises measuring a signal quality of received transmissions from macro base stations using said first frequency band, said second frequency band and at least one further frequency band and identifying as said excluded frequency band that one of said first frequency band, said second frequency band and at least one further frequency band which has a higher signal quality; and
   said selecting comprises selecting as said small cell frequency band at least one of those frequency bands other than said excluded frequency band.

9. The method of claim 7, wherein said selecting comprises selecting as said small cell frequency band that one of those frequency bands other than said excluded frequency band which has a lowest signal quality.

10. The method of claim 7, wherein said selecting comprises selecting as said small cell frequency band all of those frequency bands other than said excluded frequency band.

11. The method of claim 7, wherein said measuring comprises measuring said signal quality based on at least one of a signal to noise plus interference ratio, a ratio of a pilot power to a total cell power and pilot power of received transmissions.

12. The method of claim 7, wherein said frequency bands comprise at least one of carriers and groups of sub-carriers.

13. A computer program product stored on a non-transitory computer-readable medium, and operable, when executed on a computer, to perform the method of claim 7.

14. A wireless telecommunications network comprising:

at least one macro base station operable to provide a first region of radio coverage using a first frequency band and a second region of radio coverage using a second frequency band, said first region of radio coverage comprising a plurality of angularly spaced first radio beams, said second region of radio coverage comprising at least a second radio beam, said second radio beam being arranged to radiate from said macro base station between adjacent angularly spaced first radio beams; and at least one small cell base station comprising:
- a transmitter configured to provide a third region of radio coverage using a small cell frequency band, said small cell frequency band comprising one of said first frequency band and said second frequency band;
- a receiver configured to measure a signal quality of transmissions received from macro base stations using said first frequency band and said second frequency band and to identify as an excluded frequency band that one of said first frequency band and said second frequency band which has a highest signal quality; and
- transmission frequency band selection processor configured to select as said small cell frequency band that frequency band other than said excluded frequency band.

* * * * *